C. L. PENNELL.
TRACTION WHEEL CLEAT MECHANISM.
APPLICATION FILED MAY 22, 1919.
1,353,849.
Patented Sept. 28, 1920.
2 SHEETS—SHEET 2.
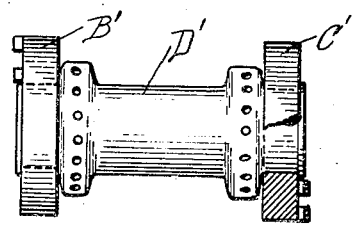
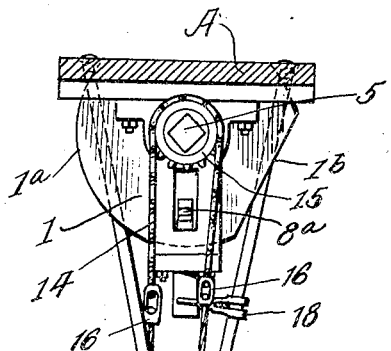
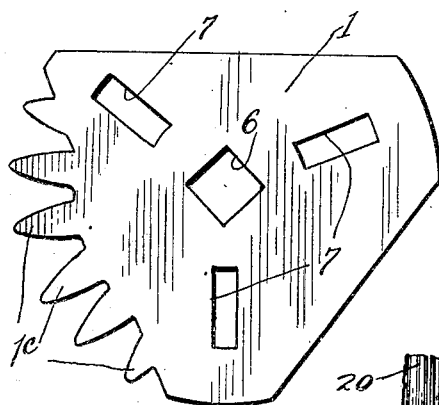
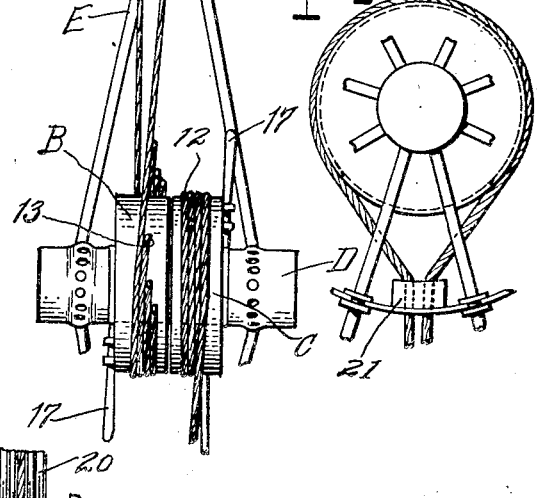
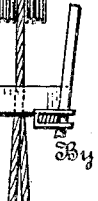
Witness
C.H. Wagner
Inventor
C. L. Pennell
By Robert Robb
Attorneys

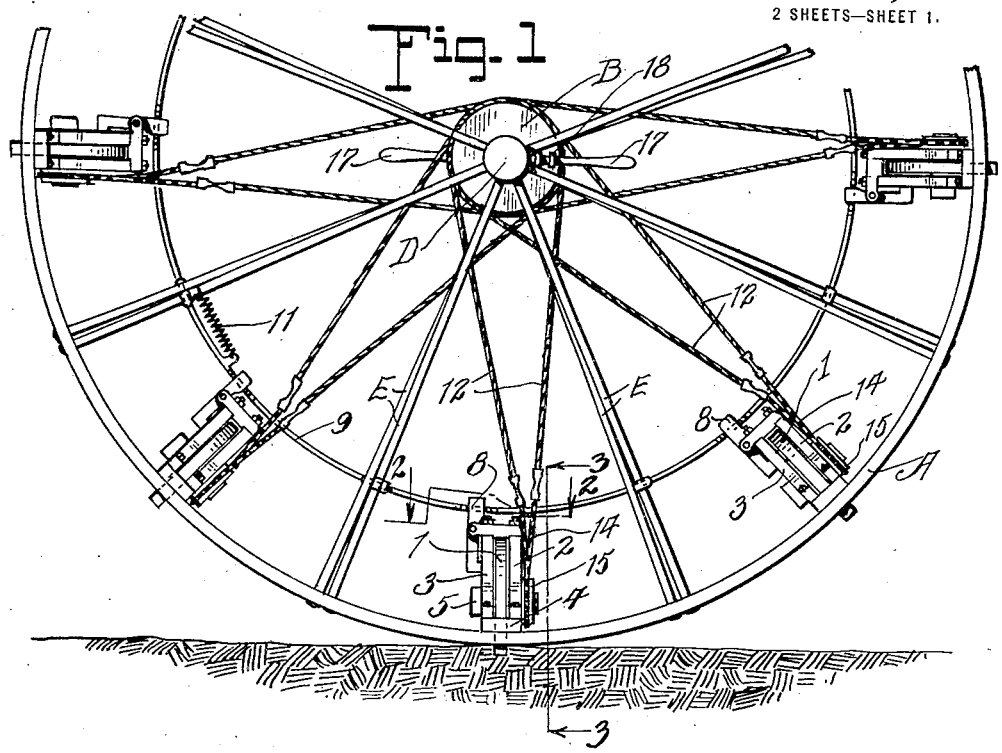

UNITED STATES PATENT OFFICE.

CHARLES L. PENNELL, OF BARRS MILLS, OHIO.

TRACTION-WHEEL CLEAT MECHANISM.

1,353,849.   Specification of Letters Patent.   Patented Sept. 28, 1920.

Application filed May 22, 1919. Serial No. 298,826.

*To all whom it may concern:*

Be it known that I, CHARLES L. PENNELL, a citizen of the United States, residing at Barrs Mills, in the county of Tuscarawas and State of Ohio, have invented certain new and useful Improvements in Traction-Wheel Cleat Mechanism, of which the following is a specification.

The improvements of this invention have to do with traction wheels of the class employing disappearing cleats or projections at the rim or periphery of the wheel. The special object of the improvements as hereinafter presented is to afford operating mechanism by which the cleats or projections are actuated, which operating mechanism is of a flexible nature such that if desired I may arrange the cleats so that they have a staggered relation around the rim of the wheel, or the cleats may be disposed in a straight line or at angles to one another, a common angular arrangement being to locate the cleats with a herring bone arrangement as well known in the art. Irrespective of whatever arrangement may be made of the cleats, the operating instrumentalities devised by me and described hereinafter are adapted for operative connection with the cleats to adjust the same whereby to render the tread of the wheel smooth, so to speak, or with projections or cleats of different forms.

Still another object of my invention has been to devise an actuator common to a series of cleats so that the cleats or projections of a series may be simultaneously adjusted whether for purposes of withdrawal or projection from the rim of the wheel.

My invention consists in additional detail features of construction such as take-up devices for the operating connections of the cleats, and the like, all of which will be fully understood in connection with the aftergoing detailed description, and the annexed drawings, in which—

Figure 1 is a partial side elevation of a traction wheel of any conventional type commonly in use, the improvements of my invention being illustrated applied thereto;

Fig. 2 is a fragmentary sectional view taken about on the line 2—2 of Fig. 1;

Fig. 3 is another sectional view taken about on the line 3—3 of Fig. 1;

Fig. 4 is a view in elevation and partly in section showing the hub of a modified form of traction wheel and illustrating a modified arrangement of operating drums such as would be preferably used in connection with said hub;

Fig. 5 is a plan view of one of the cleats and illustrating a spiked traction edge instead of the round traction edge illustrated in Fig. 3 of the drawings;

Fig. 6 is a fragmentary side view showing a modified form of drum and guiding means for the cable; and Fig. 7 is also a fragmentary view of the parts illustrated in Fig. 6.

Similar reference characters refer to similar parts throughout the following description and in the drawings.

The traction cleat with which the wheel embodying my invention is equipped is preferably of the type set forth in my copending application filed May 15, 1919 and serially numbered 297,180. It suffices therefore for this description to state that said cleat, as best shown in Fig. 3 at 1, is of somewhat disk-like form, being applied to the rim A of the wheel by being mounted between spaced brackets 2 and 3. The brackets 2 and 3 are carried by a reinforcing plate 4 attached to the rim A of the wheel by rivets or suitable fastening means. The rim A and plate 4 will of course be formed with openings through which traction elements or edges $1^a$ and $1^b$ of the cleat 1 may be projected. As shown in Fig. 3, the cleat 1 is so adjusted that one of its three main edge portions is practically flush with the rim A under which conditions a smooth tread for the rim is had.

It will be understood that any suitable number of cleats 1 may be used, located at any suitable intervals around the rim A.

Rotation of the rim A is had for purposes of adjustment of the cleat by mounting the cleat on a stub shaft 5 supported in suitable bearings in the brackets 2 and 3 aforesaid, each cleat 1 having a central square opening 6 to receive the squared middle portion of the shaft, which middle portion is not illustrated. The construction of cleat which I have above described is practically the same as my application above identified, though in Fig. 5 I have illustrated a modification of said cleat wherein one of its traction edges is equipped with spiked-like projections $1^c$. The cleat 1 is likewise provided with locking openings 7 to receive the engaging portion 8ª of a locking member 8, one of which is provided for each cleat and supported by the brackets 2 and 3 in which the cleat is mounted. The several locking members 8 of a series of cleats 1, preferably those on one half of the traction wheel, are adapted to be shifted to and from locking positions simultaneously by an actuating member 9 in the form of a flat strip equipped with lugs 10 engaging opposite sides of each locking member 8. A spring 11 is connected with the member 9 and holds it laterally in a position maintaining the locking members 8 normally operative. The locking means, as just set forth, is a part of my application above mentioned.

The means which I employ in this invention for operating the cleats 1 to adjust these cleats are shown best in Figs. 1 and 3. Said means comprise a pair of drums B and C mounted upon the hub D of the wheel and free to turn on said hub intermediate the spokes E which connect the hub with the rim A, as usual. In connection with certain types of hubs D′ the drums B′ and C′ may be located on the ends of the hub instead of upon its middle portion, said modification being shown in Fig. 4. From the hub B there extend a plurality of cable connections 12, ends of which are partially extended around said hub and connected therewith by pins 13 or otherwise. The opposite ends of said connections are attached to sprocket chains 14 which pass around and engage sprocket wheels 15. A sprocket wheel 15 is provided on each shaft 5 of each cleat and a set of the connections 12 and 14 is used for each cleat to connect it with the drum B. Preferably a series of connections 12 and 14 coöperating with the cleats on half of the wheel are connected with the drum B. A corresponding series of similar connections for the other half of the wheel are employed and similarly connected for operation by the drum C.

I preferably employ take-up devices in the form of turn-buckle contrivances 16 for attaching the cable connections 12 with the sprocket chains coacting therewith, slack in the connections being adapted to be taken up by said parts 16 in an obvious manner.

For each drum B I provide a detachable handle 17 which is adapted to be slipped into engagement with keepers 18 on its coöperating drum.

From the foregoing, it will be evident that a slight movement of the handle 17 of either drum B or C in one direction, will impart a greater and sufficient movement to the series of stub shafts 5 with which said drum is connected. Assuming that the cleats 1 of said series of stub shafts 5 have been released from the locking members 8, obviously said movement of the cleats will adjust them simultaneously to a desired position by way of projection or withdrawal dependent upon conditions.

Assuming the normal positions of the cleats 1 to be such that a smooth tread for the rim A is provided, a movement of the handle 17 in one direction will project the curved traction edges 1ª of the cleats, while a movement of the handle in the other direction will project the traction edges 1ᵇ of the cleats. Practically speaking, of course, the drums B and C will be held in their adjustable positions by the locking means coöperating with the various cleats of the series controlled by the particular drum. It will be noted also that the actuating member 9, previously described, is supported by suitable guide brackets 18 on the spokes E, seen best in Fig. 3 of the drawings.

It will be understood that the connections 12 and 14 may be changed in so far as their detail arrangement and form as illustrated are concerned. It will be evident, however, that while these connections are illustrated as adapted to cleats arranged transversely of the rim A and substantially parallel to one another, various other arrangements of the cleats, such as at angles to one another, may be utilized within the purview of my invention.

To avoid a possibility of the various cable connections leading to the drums tending to wind upon one another, these drums may be grooved as shown at 20 in Fig. 7. Additionally, if desired, the spokes E may be used to support guides 21, offstanding therefrom and through which the cable connections 12 are adapted to pass. The guides are located adjacent to the hub D of the wheel, of course, and may be attached to the spokes by any suitable means.

Having thus described my invention, what I claim as new is:—

1. In a traction wheel, the combination of a rim, cleats mounted thereon and having portions adapted to be projected and withdrawn from the rim, stub shafts supporting said cleats for rotative movement, cable connections attached to said stub shafts, and means on the wheel for operating said cable connections.

2. In a traction wheel, the combination of a rim, cleats mounted thereon and having portions adapted to be projected and withdrawn from the rim, stub shafts supporting said cleats for rotative movement, cable connections attached to said stub shafts, and means on the hub of the wheel for simultaneously operating said connections.

3. In a traction wheel, the combination of a rim, cleats mounted thereon and having portions adapted to be projected and withdrawn from the rim, stub shafts supporting said cleats for rotative movement, cable connections leading from the hub portion of the wheel to said shafts, sprocket chains attached to said cable connections and said shafts, and a drum mounted on the hub of the wheel to which said cable connections are attached whereby to operate the cable connections to actuate the cleats.

4. In a traction wheel, the combination of a rim, cleats mounted thereon and having portions adapted to be projected and withdrawn from the rim, stub shafts supporting said cleats for rotative movement, cable connections leading from the hub portion of the wheel to said shafts, sprocket chains attached to said cable connections and said shafts, a drum mounted on the hub of the wheel to which said cable connections are attached whereby to operate the cable connections to actuate the cleats, handle means for the drum, and take-up means for the cable connections, and guiding means for the cable connections.

5. In a traction wheel, the combination of a rim, a hub and spokes connecting said rim and hub, drum mechanism on said hub comprising a drum, cleat devices on the rim comprising a series of cleats disposed at intervals from one another, cable connections attached at one end to the drum, a sprocket chain attached to the opposite end of said connections, a stub shaft for each cleat, a sprocket wheel on said stub shaft engaged by said sprocket chain, and locking mechanism for the cleats by which the drum is held against movement after adjustment of the cleats through connections such as above set forth.

In testimony whereof I affix my signature.

CHARLES L. PENNELL.